(12) United States Patent
Eppert et al.

(10) Patent No.: US 7,677,665 B2
(45) Date of Patent: Mar. 16, 2010

(54) FITTING FOR A VEHICLE SEAT

(75) Inventors: Dietmar Eppert, Remscheid (DE);
Jürgen Stemmer, Remscheid (DE);
Ulrich Lehmann, Alfter (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/286,915

(22) Filed: Oct. 3, 2008

(65) Prior Publication Data

US 2009/0102265 A1     Apr. 23, 2009

Related U.S. Application Data

(63) Continuation of application No. PCT/EP2007/001486, filed on Feb. 21, 2007.

(30) Foreign Application Priority Data

Apr. 4, 2006    (DE) .................. 10 2006 015 558

(51) Int. Cl.
*B60N 2/20* (2006.01)
(52) U.S. Cl. .................. 297/362.11; 297/362
(58) Field of Classification Search ............ 297/362.11, 297/361.1, 362; 475/162, 163, 175
See application file for complete search history.

(56) References Cited

U.S. PATENT DOCUMENTS

| | | | |
|---|---|---|---|
| 4,713,986 A | 12/1987 | Cremer et al. | |
| 5,634,689 A | 6/1997 | Putsch et al. | |
| 5,755,491 A | 5/1998 | Baloche et al. | |
| 5,871,414 A * | 2/1999 | Voss et al. | 475/175 |
| 6,164,723 A | 12/2000 | Ganot | |
| 6,454,354 B1 | 9/2002 | Vossmann et al. | |

(Continued)

FOREIGN PATENT DOCUMENTS

DE    35 29 887 A1    3/1987

(Continued)

OTHER PUBLICATIONS

Office Action mailed Apr. 24, 2009 for U.S. Appl. No. 12/150,483; In re: Eppert et al., entitled Fitting for a Vehicle Seat.

(Continued)

*Primary Examiner*—Milton Nelson, Jr.
(74) *Attorney, Agent, or Firm*—Womble Carlyle Sandridge & Rice, PLLC

(57) ABSTRACT

A compound fitting (18) for a vehicle seat, especially for an automotive seat, comprises two individual fittings (10, 50) that are arranged axially juxtaposed and in parallel in relation to the flow of force, and that each have at least two fitting parts (11, 12, 40, 51, 52) that can be rotated in relation to one another, the inner fitting parts being interlinkable and the outer fitting parts being interlinkable. One of the individual fittings is a adjusting fitting (10) for adjusting the compound fitting (8), and the other individual fitting is a locking fitting (50) for locking the compound fitting (8). Two fitting parts (11, 12) of the adjusting fitting (10) can be interlinked by way of a non-self-locking eccentric epicyclic gear. At least to a large extent, the locked locking fitting (50) bridges the adjusting fitting (10) in terms of the flow of force.

20 Claims, 3 Drawing Sheets

U.S. PATENT DOCUMENTS

| | | |
|---|---|---|
| 6,619,743 B1 | 9/2003 | Scholz et al. |
| 7,455,361 B2 * | 11/2008 | Stemmer et al. ............ 297/362 |
| 7,497,519 B2 | 3/2009 | Dill et al. |
| 2003/0214165 A1 | 11/2003 | Finner et al. |
| 2005/0127732 A1 | 6/2005 | Peters |
| 2006/0006717 A1 | 1/2006 | Sakamoto |
| 2006/0170269 A1 | 8/2006 | Oki |
| 2008/0185892 A1 | 8/2008 | Peters et al. |
| 2008/0203784 A1 | 8/2008 | Eppert et al. |
| 2009/0072605 A1 | 3/2009 | Otto et al. |

FOREIGN PATENT DOCUMENTS

| | | |
|---|---|---|
| DE | 44 36 101 A1 | 6/1995 |
| DE | 195 27 374 A1 | 1/1997 |
| DE | 199 15 863 A1 | 10/1999 |
| DE | 199 04 300 C1 | 8/2000 |
| DE | 199 38 666 A1 | 2/2001 |
| DE | 102 53 054 A1 | 6/2004 |
| DE | 103 27 640 B3 | 12/2004 |
| DE | 10 2005 046 807 B3 | 11/2006 |
| WO | WO 00/44582 A1 | 8/2000 |
| WO | WO 03/024740 A1 | 3/2003 |
| WO | WO 2007/039002 A2 | 4/2007 |

OTHER PUBLICATIONS

US 6,648,413, 11/2003, Uramichi (withdrawn)

* cited by examiner

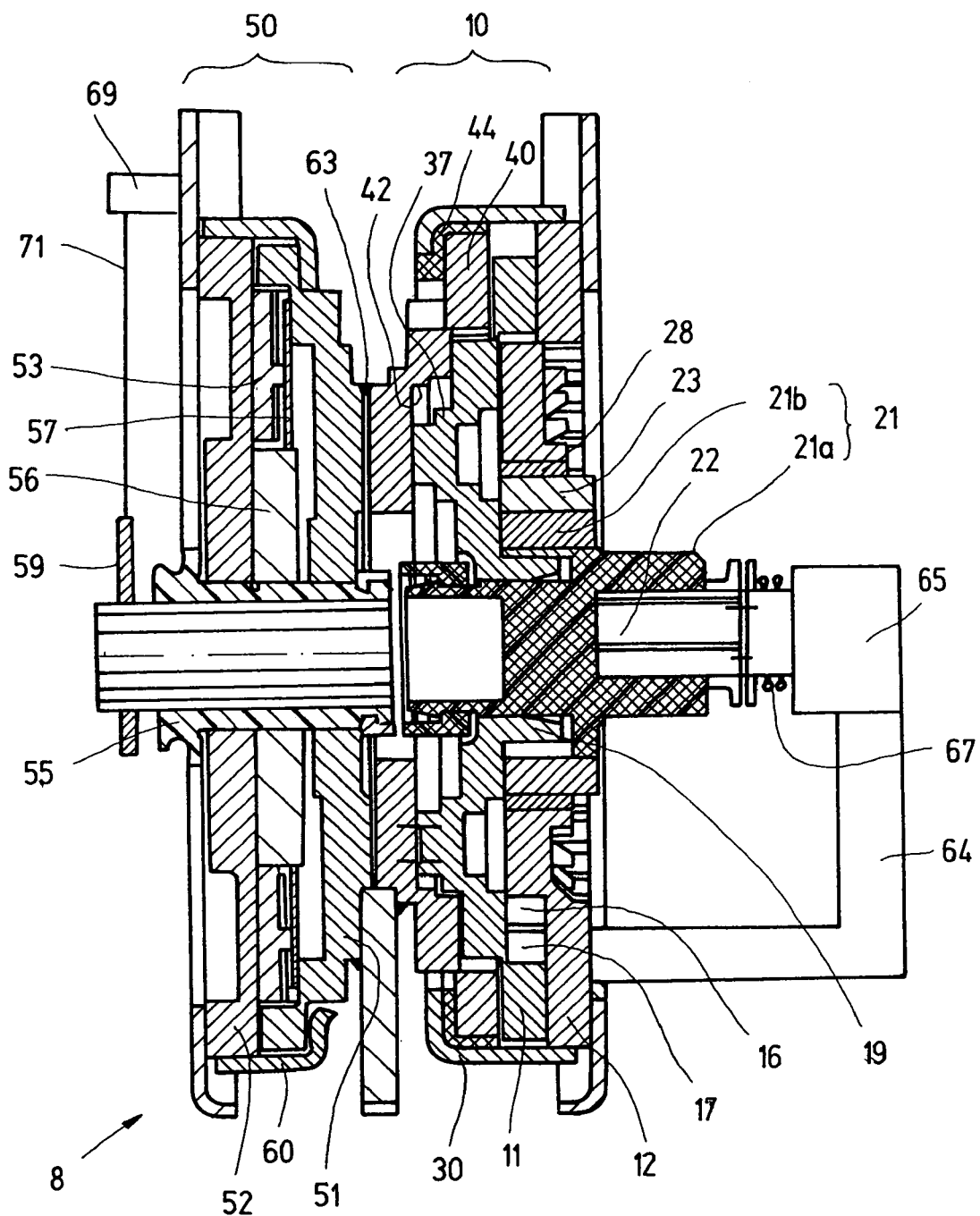
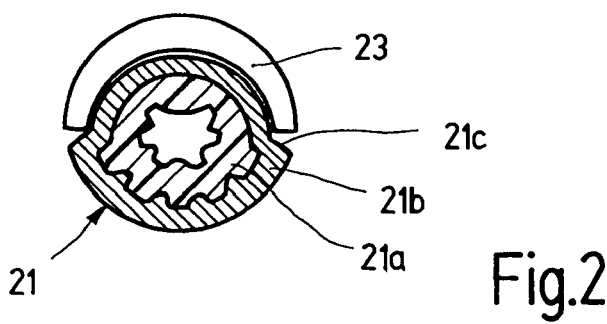
Fig.1
Fig.2

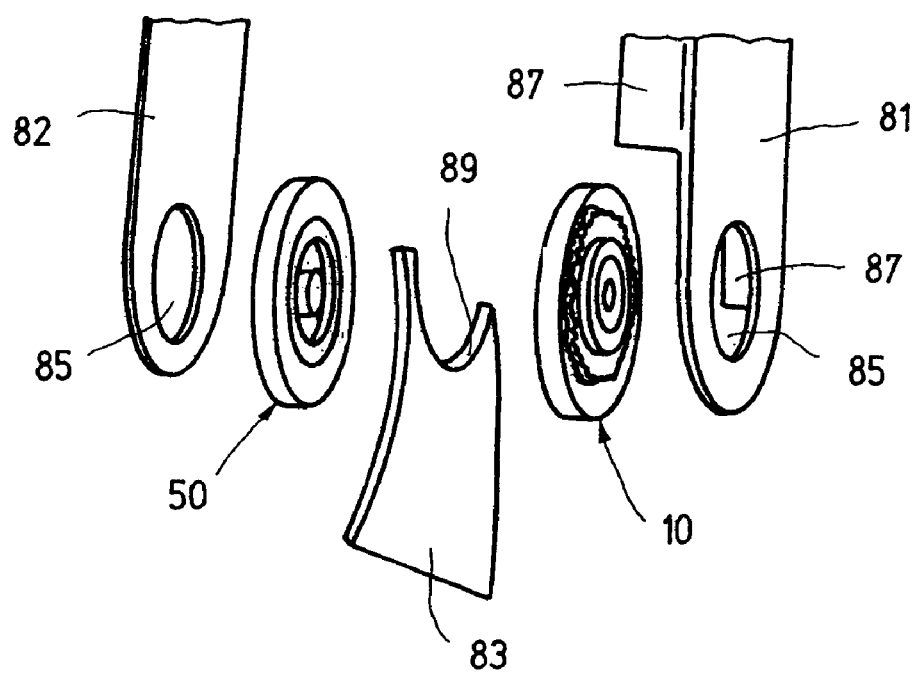
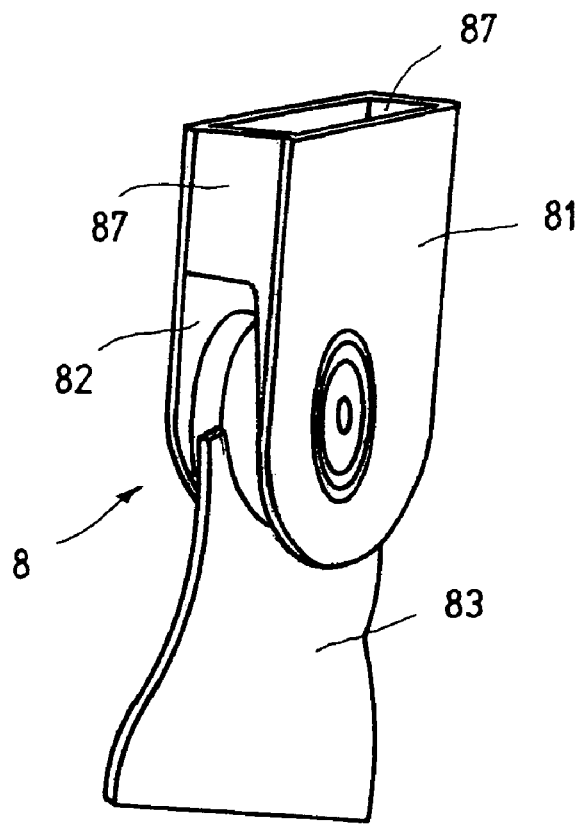
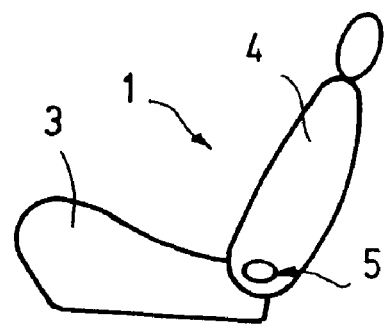
Fig.4
Fig.5
Fig.6

FITTING FOR A VEHICLE SEAT

CROSS-REFERENCE TO RELATED APPLICATION

The present application is a continuation of International Application PCT/EP2007/001486, which was filed Feb. 21, 2007. The entire disclosure of International Application PCT/EP2007/001486, which was filed Feb. 21, 2007, is incorporated herein by reference.

TECHNICAL FIELD

The present invention relates to a fitting for a vehicle seat, in particular for a motor vehicle seat, with two individual fittings that are arranged axially next to one another, each have at least two fitting parts that are rotatable relative to one another, and of which the inner fitting parts can be connected to one another and the outer fitting parts can be connected to one another.

BACKGROUND OF THE INVENTION

U.S. Pat. No. 5,755,491 discloses a fitting of the type mentioned above, in the Technical Field section of this disclosure, in which a geared fitting and a latching fitting are arranged in series with regard to the flow of force. The geared fitting serves for the adjustment of the inclination of a backrest, and the latching fitting serves for the free-pivoting of the backrest, i.e. in order to facilitate access to a rear row of seats by pivoting the backrest forward. The geared fitting can in principle be driven by motor, while the latching fitting is unsuitable for being driven by motor.

BRIEF SUMMARY OF SOME ASPECTS OF THE INVENTION

An aspect of the present invention is the provision of improvements to a fitting of the type mentioned above, in the Technical Field section of this disclosure. In accordance with one aspect of the present invention, a fitting (e.g., a compound fitting) for a vehicle seat, in particular for a motor vehicle seat, has two individual fittings that are arranged axially next to one another. Each of the individual fittings has at least two fitting parts that are rotatable relative to one another, and of which the inner fitting parts can be (e.g., are) connected to one another and the outer fitting parts can be (e.g., are) connected to one another. One of the individual fittings is an adjustment fitting for adjusting the compound fitting, and the other individual fitting is a locking fitting for fixing (e.g., locking) the compound fitting. Fitting parts of the adjustment fitting are connected to one another by way of a non-self-locking eccentric epicyclic gear. The locked locking fitting at least substantially bridges the adjustment fitting with regard to the flow of force.

Because one individual fitting is designed as an adjustment fitting for adjusting the fitting, and the other individual fitting is designed as a locking fitting for fixing (e.g., locking) the compound fitting, the adjustment fitting can be optimized in respect of its efficiency, and the locking fitting can be optimized in respect of the freedom from play and crash load absorption. To improve the efficiency, the two fitting parts of the adjustment fitting are connected to one another by way of a non-self-locking eccentric epicyclic gear, i.e. the adjustment fitting runs very smoothly, which is advantageous both in the case of a manual drive and in the case of a motorized drive. The locked locking fitting, which may be a latching fitting or a break, at least substantially, preferably completely, bridges the adjustment fitting with regard to the flow of force, i.e. the adjustment fitting at best contributes little to the fixing (e.g., locking) of the compound fitting, for example because of inertia effects. A compensating part is preferably provided which can compensate for a wobbling movement of the two fitting parts of the adjustment fitting, and the wobbling movement can be transferred into a coaxial movement as also executed by the locking fitting.

In the case of a preferred disk form of the fitting parts, the compound fitting can be provided in a simple manner as a preassembled unit, with, preferably, a transport securing means—produced, for example, by laser welding—ensuring a first connection of the individual fittings, which connection is then secured by the fitting of the adapters, with it being possible for the adapter geometry, which is matched to the disk shape, to be designed very simply.

The fitting according to the invention is preferably used for adjusting the inclination of the backrest, for example in the case of an individual seat, in particular a seat with an integral belt, or in the case of a rear seat system with a divided backrest (40%/60%) in the second or third row of seats, but can also be used elsewhere as a drive in the vehicle seat, for example for a height adjuster or inclination adjuster of the seat cushion.

Other aspects and advantages of the present invention will become apparent from the following.

BRIEF DESCRIPTION OF THE DRAWINGS

The present invention is explained in more detail with reference to an exemplary embodiment which is illustrated in the drawings, in which:

FIG. 1 shows a section through the compound fitting of the exemplary embodiment in the axial direction, FIG. 2 shows a section through the eccentric of the adjustment fitting perpendicular to the axial direction, FIG. 4 shows an exploded illustration of the compound fitting with assembled individual fittings, without a transport securing means, and with an adapter, FIG. 5 shows a perspective view of the compound fitting together with the adapter, and FIG. 6 shows a schematized vehicle seat.

DETAILED DESCRIPTION OF EXEMPLARY EMBODIMENT

Figure 3:
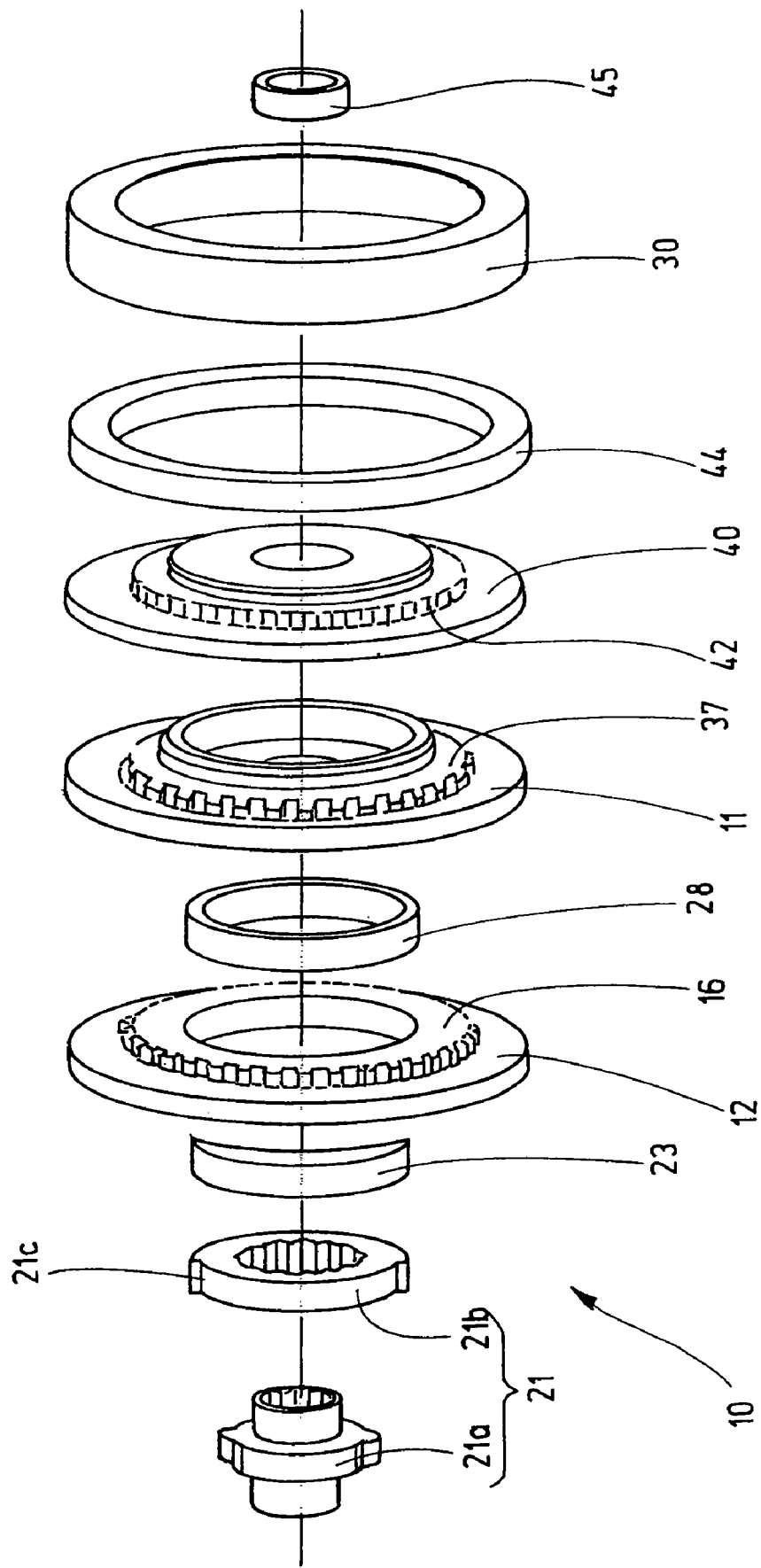
FIG. 3 shows an exploded illustration of the adjustment fitting.

A vehicle seat 1 has a seat part 3 and a backrest 4 which is fitted by way of a fitting arrangement 5 to the seat part and can be adjusted in its inclination relative to the seat part. The vehicle seat 1 may form, for example, part of a rear seat system of a motor vehicle. The backrest pivot axis serves as the axial direction in the cylindrical coordinate system used in the following Detailed Description section of this disclosure. The fitting arrangement 5 comprises a compound fitting 8 at least on one side of the vehicle seat. The compound fitting 8 is designed as a double fitting, i.e. it comprises two individual fittings which are basically fully functional per se and are arranged axially next to one another. The individual fittings are not of identical design and are arranged alternatively to each other with regard to the flow of force.

An adjustment fitting 10 is provided in each case as the first individual fitting of the compound fitting 8. The adjustment fitting 10 has good efficiency for the adjustment of the inclination of the backrest 4 and therefore serves to adjust the compound fitting 8. In the exemplary embodiment, the adjustment fitting 10 is preferably designed to be driven by a motor (a motorized drive). The adjustment fitting 10 has a first adjustment fitting part 11 and a second adjustment fitting part 12. For providing the adjusting, the first and second adjustment fitting parts 11, 12 are connected to one another by way of a gear designed as a non-self-locking eccentric epicyclic gear. The two adjustment fitting parts 11 and 12 are each generally in the form of a flat disk. To form the gear, a toothed wheel 16 with an external toothing is impressed on the second adjustment fitting part 12, a toothed ring 17 with an internal toothing is impressed on the first adjustment fitting part 11, and toothed wheel and toothed ring mesh with each other. The diameter of the addendum circle of the external toothing of the toothed wheel 16 is smaller by at least one tooth height than the diameter of the dedendum circle of the internal toothing of the toothed ring 17. The corresponding difference in the number of teeth of toothed wheel 16 and toothed ring 17 permits a rolling movement of the toothed ring 17 relative to the toothed wheel 16.

On the side facing the toothed wheel 16, the first adjustment fitting part 11 has an integrally formed collar formation 19 concentric to the internal toothing of the toothed ring 17. A driver 21 is provided in accordance with WO 03/024740 A1. The entire disclosure of WO 03/024740 A1 is expressly incorporated herein by reference. The driver 21, which is constructed in two parts, comprises a driving bushing 21a and a driving ring 21b. The driving bushing 21a projects with a gap into the collar formation 19. The driving bushing 21a has, in the center, an internal profile for receiving a profiled drive shaft 22. The driving ring 21b is connected in a rotationally fixed manner to the driving bushing 21a and is arranged outside the collar formation 19. The driving ring 21b together with a crescent-shaped element, referred to in short below as sickle element 23, defines an eccentric. In the exemplary embodiment, the sickle element 23 is held with a degree of play in the circumferential direction by a driving segment 21c of the driving ring 21b. Driven by a rotation of the drive shaft (and therefore of the driver 21), the eccentric (the combination of the driving ring 21b and the sickle element 23) revolves in a sliding bearing bushing 28 of the second adjustment fitting part 12 and thereby brings about the relative rolling movement of (e.g., between) the toothed ring 17 and toothed wheel 16. The relative rolling movement is represented in the form of a relative rotational movement of the first adjustment fitting part 11 and second adjustment fitting part 12 with a superimposed wobbling movement. In the region of maximum eccentricity, the driving ring 21b is supported on the collar formation 19.

A first clasping ring, which is referred to as the adjustment fitting ring 30 in the following, is provided to axially hold together the adjustment fitting 10. Firstly, the adjustment fitting ring 30 is arranged along the outer circumference of the second adjustment fitting part 12 and is connected thereto, for example is pressed on and, if appropriate, laser-welded. Secondly, the adjustment fitting ring 30 engages over the first adjustment fitting part 11.

While the driving bushing 21a is preferably manufactured from plastic, the other components of the adjustment fitting 10 are preferably composed of metal, for example steel, if appropriate sintered, hardened or treated in some other way.

As an alternative to the construction described above, the driving ring 21b and the sickle element 23 can be formed integrally with each other as a fixed eccentric. It is also possible for the entire driver 21 to be of single-part design, or for the driver 21 and the sickle element 23 to be replaced by a single-part fixed eccentric. If the sickle element 23 is replaced by two wedge segments in accordance with WO 03/024740 A1, the adjustment fitting 10 is free from play in the non-driven rest state.

On the first adjustment fitting part 11, an external toothing 37, which is formed in a common stamping operation together with the toothed ring 17, is provided on the side facing away from the second adjustment fitting part 12. Furthermore, a compensating part 40 is arranged, as the third fitting part, on the first adjustment fitting part 11, on the side which faces away from the second adjustment fitting part 12. The compensating part 40, like the two adjustment fitting parts 11 and 12, is generally in the form of a flat disk and is composed of steel. The side of the compensating part 40 which faces the first fitting part 11 is designed as an internal gear 42, i.e. is provided with a corresponding internal toothing. The internal gear 42 meshes with the external toothing 37. The dedendum circle of the internal gear 42 has a diameter which is larger by at least one tooth height than the addendum circle of the external toothing 37, and the number of teeth of the internal gear 42 differs in accordance with the number of teeth of the external toothing 37.

The compensating part 40 is arranged coaxially with the second adjustment fitting part 12, i.e. the axes of rotation are aligned with each other. The diameter of the compensating part 40 is preferably slightly smaller than the diameter of the second adjustment fitting part 12, and—like the first adjustment fitting part 11—the compensating part 40 is engaged over by the adjustment fitting ring 30. A bearing ring 44 is preferably arranged radially between the compensating part 40 and the adjustment fitting ring 30. A securing ring 45 serves as a means of securing the driver 21. The securing ring 45 is fitted to the driver 21 and is preferably clipped to the driving bushing 21a. The precise design of the internal gear 42 is selected in such a manner that the wobbling movement of the first adjustment fitting part 11 relative to the second adjustment fitting part 12 is compensated for by a further wobbling movement of the compensating part 40 relative to the first adjustment fitting part 11. The compensating part 40 therefore describes (e.g., provides) a pure rotational movement relative to the second adjustment fitting part 12.

The second individual fitting of the compound fitting 8 is a locking fitting 50. The locking fitting 50 serves to fix (e.g., lock) the compound fitting 8 in the various positions of the backrest 4, since the non-self-locking adjustment fitting 10 cannot contribute to fix (e.g., lock) the compound fitting 8 in the various positions of the backrest 4. The locked locking fitting 50 bridges the adjustment fitting 10 with regard to the flow of force. The open locking fitting 50 gives the adjustment fitting 10 full freedom of movement and the full flow of force during the driving of the adjustment fitting 10. The "alternating switching" of the exemplary embodiment of the present invention is different from a constant parallel arrangement with regard to the flow of force, as is known for increased load absorption, for example from DE 35 29 887 C2, and serves for seats with integral belts.

The locking fitting 50 is designed as a latching fitting in a manner described in WO 00/44582 A1. The entire disclosure of WO 00/44582 A1 is expressly incorporated herein by reference. The locking fitting 50 has a first locking fitting part 51 and a second locking fitting part 52. The first and second locking fitting parts 51, 52 are each generally in the form of a flat disk. The second locking fitting part 52 has four guide and bearing segments for radially guiding second locking elements 53 and for supporting the first locking fitting part 51. Corresponding to (e.g., like) the first adjustment fitting part 11, the first locking fitting part 51 has a toothed ring with an internal toothing. With its toothed ring, the first locking fitting part 51 interacts with the locking elements 53 in order to lock the locking fitting 50, and first locking fitting part 51 also rests on the guide and bearing segments for the mounting of the first locking fitting part 51 on the second locking fitting part 52. The locking elements 53 are pressed radially outward to the toothed ring of the first locking fitting part 51 by way of a spring-loaded, second eccentric 56 that sits in a rotationally fixed manner on a second driver 55. In order to unlock the locking fitting 50, the locking elements 53 are pulled radially inward from the toothed ring of the first locking fitting part 51. The locking elements 53 are pulled radially inward by a driving disk 57. The driving disk 57 is rotatable by way of the second eccentric 56. Alternatively, the driving disk 57 is directly rotatable by way of the second driver 55, in response to actuation of a lever 59 which is arranged outside the locking fitting 50 and acts on the second driver 55. A locking fitting ring 60 is provided analogously to the adjustment fitting ring 30. The locking fitting ring 60 is arranged along the outer circumference of the second locking fitting part 52 and is connected thereto, for example being pressed on, and also engages over the first locking fitting part 51.

Depending on requirements, in particular on the construction space available and on the type of drive used, the adjustment fitting 10 and the locking fitting 50 are oriented in a predetermined configuration with respect to one another. The "inner fitting parts", for example the compensating part 40 of the adjustment fitting 10 and the first fitting part 51 of the locking fitting 50, face each other and are connected to one another, for example by way of individual welding points, which may be referred to as transport securing means 63. The "outer fitting parts", i.e., in the exemplary embodiment, the second adjustment fitting part 12 and the second locking fitting part 52, face away from each other. The lever 59 is arranged on the outside of the second locking fitting part 52 while an electric motor 65 with a clutch 67 is arranged on a motor support 64 on the outside of the second adjustment fitting part 12 (or within the eccentric of the adjustment fitting 10). The clutch 67 drives the drive shaft 22 which engages in the driver 21. A relay 69 is connected to the lever 59 by way of a cable pull 71.

If the inclination of the backrest 4 is to be changed, first of all the relay 69 is actuated and unlocks the locking fitting 50 by way of the lever 59 and actively keeps it in the unlocked state. The electric motor 65 then drives the adjustment fitting 10. When the desired inclination is reached, the electric motor 65 stops, and the relay 69 releases the lever 59 such that the locking fitting 50 can automatically lock. In order to resolve "tooth on tooth" positions, it is possible that the electric motor 65 rotates back slightly (or rotates further) before finally stopping, and therefore the locking fitting 50 is rotated by approximately half a tooth position and can be completely locked.

In emergency situations (i.e. when there is no on-board power supply, for example if, after an accident, occupants of a row of seats arranged further to the rear not having their own doors have to get out), it is possible for the occupants to manually unlock the locking fitting 50 of the vehicle seat 1 arranged in front and, by way of pressure on the backrest 4, to manually drive the adjustment fitting 10—making use of the lack of self-locking—such that the backrest 4 pivots forward.

In order to connect the compound fitting 8 to the seat part 3, on the one hand, and the backrest 4, on the other hand, a first outer adapter 81, a second outer adapter 82 and an inner adapter 83 are provided. The two outer adapters 81 and 82 both have, perpendicularly to the axial direction, a basically planar shape with a respective bearing eye 85 from which connecting tabs 87 on the edge can protrude axially. In the exemplary embodiment, two connecting tabs 87 protrude from the first outer adapter 81 and none from the second outer adapter 82. The two outer adapters 81 and 82 are to be connected to one another by way of the connecting tabs 87 with a hollow box being formed. The inner adapter 83 has a fork 89 with a semicircular receptacle. For special high-load situations, the inner adapter 83 can be extended radially beyond the center of the compound fitting 8 and, instead of the fork 89, can have a further bearing eye surrounded annularly by material.

In order to fit the adapters 81, 82 and 83, the compound fitting 8 is received by the fork 89 of the inner adapter 83 and then the inner adapter 83 is fixedly connected to the "inner fitting parts" 40, 51, preferably is welded thereto, and very particularly preferably is laser-welded thereto. The "outer fitting parts" 12, 52 are then engaged over by the outer adapters 81 and 82, with, preferably, a respective offset of the "outer fitting parts" 12, 52 coming to lie in a respective bearing eye 85. Then, the outer adapters 81 and 82 are fixedly connected directly to the respective "outer fitting parts" 12, 52 and to one another by way of the connecting tabs 87. The assignment to the seat part 3 and backrest 4 depends on the application. The connecting tabs 87 are arranged at such a distance from the backrest pivot axis that the inner adapter 83 can dip between the outer adapters 81 and 82 when the backrest 4 is pivoted forward.

An arrangement of the adjustment fitting 10 and locking fitting 50, in which the adjustment fitting ring 30 and the locking fitting ring 60 are connected to the respective "inner fitting parts", i.e. can be jointly connected to the fork 89 of the inner adapter 83, is particularly preferable because of the fixed and therefore good connection option.

It will be understood by those skilled in the art that while the present invention has been discussed above with reference to an exemplary embodiment, various additions, modifications and changes can be made thereto without departing from the spirit and scope of the invention as set forth in the claims.

That which is claimed:

1. A compound fitting for a vehicle seat, the compound fitting comprising:
    two individual fittings comprising
        an adjustment fitting having at least two fitting parts that are rotatable relative to one another, and a non-self-locking eccentric epicyclic gear between the fitting parts, and
        a locking fitting having at least two fitting parts that are rotatable relative to one another, wherein the locking fitting is operative for restricting relative rotation between the fitting parts of the locking fitting while the locking fitting is locked;
    the locking fitting and the adjustment fitting being arranged axially next to one another so that
        the fitting parts of the locking fitting comprise
            a first inner fitting part of the compound fitting and
            a first outer fitting part of the compound fitting, and
        the fitting parts of the adjustment fitting comprise
            a second inner fitting part of the compound fitting and
            a second outer fitting part of the compound fitting;
    the locking fitting and the adjustment fitting being connected to one another so that
        the locking fitting is for locking the compound fitting,
        the adjustment fitting, which includes the non-self-locking eccentric epicyclic gear, is for adjusting the compound fitting, and the locking fitting is for at least substantially bridging the adjustment fitting with regard to flow of force through the compound fitting while the locking fitting is locked.

2. The compound fitting as claimed in claim 1, comprising:
the first inner fitting part being at least approximately a disk;
the first outer fitting part being at least approximately a disk;
the second inner fitting part being at least approximately a disk;
the second outer fitting part being at least approximately a disk;
a first ring axially holding together the first inner fitting part and the first outer fitting part; and
a second ring axially holding together the second inner fitting part and the second outer fitting part.

3. The compound fitting as claimed in claim 2, wherein the locking fitting and the adjustment fitting being connected to one another comprises the first and second inner fitting parts being fixedly connected to one another by way of an inner adapter, and the inner adapter having a fork or a bearing eye that is in receipt of the first and second inner fitting parts.

4. The compound fitting as claimed in claim 3, wherein the locking fitting and the adjustment fitting being connected to one another comprises the first and second outer fitting parts being fixedly connected to one another by way of first and second outer adapters that are connected to one another, the first outer adapter having a bearing eye that is in receipt of the first outer fitting part, and the second outer adapter having a bearing eye that is in receipt of the second outer fitting part.

5. The compound fitting as claimed in claim 2, wherein the locking fitting and the adjustment fitting being connected to one another comprises the first and second outer fitting parts being fixedly connected to one another by way of first and second outer adapters that are fixedly connected to one another, the first outer adapter having a bearing eye that is in receipt of the first outer fitting part, and the second outer adapter having a bearing eye that is in receipt of the second outer fitting part.

6. The compound fitting as claimed in claim 1, wherein the locking fitting is a latching fitting, and the compound fitting is adapted so that the latching fitting is unlocked before the compound fitting is adjusted by way of the adjustment fitting.

7. The compound fitting as claimed in claim 1, comprising a motor for driving the adjustment fitting.

8. The compound fitting as claimed in claim 7, wherein the compound fitting is adapted so that the adjustment fitting can also be driven manually while the locking fitting is unlocked.

9. The compound fitting as claimed in claim 1, comprising:
the adjustment fitting having a third fitting part that is positioned between the second inner fitting part and the second outer fitting part; and
the second outer fitting part and the third fitting part being connected to one another by way of the non-self-locking eccentric epicyclic gear, so that the second outer fitting part and the third fitting part can be driven to perform a relative rotational movement with a superimposed wobbling movement.

10. The compound fitting as claimed in claim 9, comprising:
the second inner fitting part being adapted for being driven by the third fitting part so that the second inner fitting part executes
a rotational movement with a superimposed wobbling movement relative to the third fitting part, and
a pure rotational movement relative to the second outer fitting part, whereby the second inner fitting part is adapted for compensating for the superimposed wobbling movement provided by way of the non-self-locking eccentric epicyclic gear.

11. The compound fitting as claimed in claim 1 in combination with the vehicle seat, the vehicle seat comprising a seat part and at least one backrest, the compound fitting being connected between the seat part and the backrest for adjusting the backrest's inclination with respect to the seat part.

12. The compound fitting as claimed in claim 1, wherein the locking fitting and the adjustment fitting being connected to one another comprises the first and second inner fitting parts being fixedly connected to one another.

13. The compound fitting as claimed in claim 12, wherein the locking fitting and the adjustment fitting being connected to one another comprises the first and second outer fitting parts being fixedly connected to one another.

14. The compound fitting as claimed in claim 1, wherein the locking fitting and the adjustment fitting being connected to one another comprises the first and second inner fitting parts being fixedly connected to one another by way of an inner adapter.

15. The compound fitting as claimed in claim 14, wherein the locking fitting and the adjustment fitting being connected to one another comprises the first and second outer fitting parts being fixedly connected to one another by way of one or more outer adapters.

16. The compound fitting as claimed in claim 1, wherein the locking fitting and the adjustment fitting being connected to one another comprises a transport securing means directly connecting the adjustment fitting and the locking fitting to one another.

17. The compound fitting as claimed in claim 1, wherein the locking fitting and the adjustment fitting being connected to one another comprises the first and second outer fitting parts being fixedly connected to one another by way of one or more outer adapters.

18. A compound fitting for a vehicle seat, the compound fitting comprising:
two individual fittings comprising
an adjustment fitting having at least two fitting parts that are rotatable relative to one another, and an eccentric epicyclic gear between the fitting parts, and
a locking fitting having at least two fitting parts that are rotatable relative to one another, wherein the locking fitting is operative for restricting relative rotation between the fitting parts of the locking fitting while the locking fitting is locked;
the locking fitting and the adjustment fitting being arranged axially next to one another so that
the fitting parts of the locking fitting comprise
a first inner fitting part of the compound fitting and
a first outer fitting part of the compound fitting, and
the fitting parts of the adjustment fitting comprise
a second inner fitting part of the compound fitting and
a second outer fitting part of the compound fitting, and
an inner adapter fixedly connected to the first and second inner fitting parts so that the first and second inner fitting parts are fixedly connected to one another;
an outer adapter fixedly connected to the first and second outer fitting parts so that the first and second outer fitting parts are fixedly connected to one another;
the locking fitting being operative for locking the compound fitting to restrict relative rotational movement between the inner adapter and the outer adapter while the locking fitting is locked;

the adjustment fitting being operative, while the locking fitting is unlocked, for adjusting the compound fitting so that there is relative rotational movement between the inner adapter and the outer adapter;

the locking fitting and the adjustment fitting being arranged in parallel with one another with respect to flow of at least some force through the compound fitting; and the eccentric epicyclic gear of the adjustment fitting being a non-self-locking eccentric epicyclic gear, so that the locking fitting at least substantially bridges the adjustment fitting with regard to flow of force through the compound fitting while the locking fitting is locked.

19. The compound fitting as claimed in claim 18, comprising:

the first inner fitting part being at least approximately a disk;

the first outer fitting part being at least approximately a disk;

the second inner fitting part being at least approximately a disk;

the second outer fitting part being at least approximately a disk;

a first ring axially holding together the first inner fitting part and the first outer fitting part; and a second ring axially holding together the second inner fitting part and the second outer fitting part.

20. The compound fitting as claimed in claim 18, wherein:

the outer adapter comprises
  a first outer adapter fixedly connected to the first outer fitting part,
  a second outer adapter fixedly connected to the second outer fitting part, and
  the first outer adapter being fixedly connected to the second outer adapter;

the locking fitting being a latching fitting; and the compound fitting being adapted so that the latching fitting is unlocked before the compound fitting is adjusted by way of the adjustment fitting.

* * * * *